United States Patent
Koziski et al.

(10) Patent No.: US 7,919,556 B2
(45) Date of Patent: Apr. 5, 2011

(54) LOW VOC AQUEOUS COMPOSITIONS OF PHOSPHORUS ACID FUNCTIONAL POLYMERS AND POLYURETHANES

(75) Inventors: Kathleen A. Koziski, Lansdale, PA (US); Gary R. Larson, Hatfield, PA (US); William J. Rosano, Hatboro, PA (US); Aurelia de las Cuestas Sheppard, Newtown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 12/455,842

(22) Filed: Jun. 8, 2009

(65) Prior Publication Data

US 2009/0312469 A1 Dec. 17, 2009

Related U.S. Application Data

(60) Provisional application No. 61/131,694, filed on Jun. 11, 2008.

(51) Int. Cl.
*C08K 5/10* (2006.01)

(52) U.S. Cl. ........ 524/507; 524/127; 524/140; 524/141; 524/314; 524/378

(58) Field of Classification Search .......... 524/507, 524/127, 140, 141, 314, 378
See application file for complete search history.

(56) References Cited

U.S. PATENT DOCUMENTS

| | | | |
|---|---|---|---|
| 4,954,559 A | 9/1990 | Den Hartog et al. | |
| 5,541,251 A | 7/1996 | Bontinck et al. | |
| 5,922,410 A | 7/1999 | Swartz et al. | |
| 6,566,438 B1 | 5/2003 | Ingrisch et al. | |
| 6,890,983 B2 | 5/2005 | Rosano et al. | |
| 7,265,178 B2 * | 9/2007 | Maier et al. | 524/507 |
| 7,358,295 B2 * | 4/2008 | Miller et al. | 524/507 |
| 2006/0148980 A1 | 7/2006 | Tielemans et al. | |
| 2006/0223935 A1 | 10/2006 | Fasano et al. | |

FOREIGN PATENT DOCUMENTS

| | | |
|---|---|---|
| EP | 0 379 158 A2 | 7/1990 |
| EP | 1 193 298 A1 | 4/2002 |
| GB | 2 298 427 A | 9/1996 |
| JP | H6-329985 | 11/1994 |
| JP | 2007-191686 | 8/2007 |
| JP | 2007-291549 | 11/2007 |
| WO | WO 92/17546 | 10/1992 |

\* cited by examiner

*Primary Examiner* — Peter Szekely
(74) *Attorney, Agent, or Firm* — Andrew E C Merriam

(57) ABSTRACT

The present invention provides compositions that enable excellent hardness in coating applications, the compositions containing one or more copolymer having as copolymerized units one or more acrylic monomer with a phosphorus acid-functional group, a polymeric side chain containing multi-acid functional groups, a salt thereof, or a combination thereof, one or more polyurethane dispersion made from a high molecular weight polyol, and one or more coalescent having a normal boiling point of 190° C. or higher. The compositions may be ambient curable.

8 Claims, No Drawings

LOW VOC AQUEOUS COMPOSITIONS OF PHOSPHORUS ACID FUNCTIONAL POLYMERS AND POLYURETHANES

This application claims priority from U.S. Provisional Application 61/131,694, filed on Jun. 11, 2008.

The present invention relates to acrylic copolymer and polyurethane dispersion aqueous compositions, in particular, to aqueous compositions comprising one or more coalescent having a normal boiling point of 190° C. or higher that are suitable for use in protective coatings, having a low level of volatile organic compounds (VOCs).

Increasingly stringent policies and regulations for the protection of the environment have led to increased the demand for protective coatings having a low VOC content. Aqueous coating compositions having low VOCs also provide reduced odor and toxicity.

Conventional methods for producing low VOC coatings comprising organic polymer binders, such as those formed from the free-radical polymerization of ethylenically unsaturated monomers, include forming polymer compositions having glass transition temperatures (Tg) close to or well below ambient application conditions and combining them with low, if any, levels of coalescing solvents to effectively reduce the minimum film formation temperature of the coating composition. Another common approach for producing low to zero VOC coatings combines polymers with Tgs well above ambient application conditions in combination with a nonvolatile or partially nonvolatile coalescent. Such coalescents may be added as separate ingredients during coating formulation; or they may comprise a polymer generated either during the polymerization of the binder, or generated separately. Coalescents are known to lower the overall Tg of the binder. However, these conventional approaches tend to provide paints having inferior hardness properties, poor blocking resistance, poor soil resistance, and surface tack. Additionally, the use of coalescing solvents that are VOCs is undesirable as these coalescing solvents raise odor, toxicity and environmental concerns.

Japanese Patent No. JP 3295491 discloses an automotive paint containing (A) acrylic resin containing a phosphoric group; (B) urethane resin emulsion prepared by reacting (1) aliphatic and/or alicyclic diisocyanate, (2) polyetherdiol and/or polyesterdiol with an average molecular weight between 500 and 5000, (3) low molecular weight polyhydroxy compound, and (4) dimethylol alkanoic acid; and (C) crosslinking agent. However, the invention of JP H6-329985 is not ambient curable and must be baked at elevated temperature to cure. Further, JP 3295491 provides compositions wherein residual solvent from polymerization volatilizes in baking and wherein the lowest baking temperature used approaches the boiling point of even the least volatile coalescing solvent disclosed; hence, at least some of that coalescent volatilizes.

There remains a need for compositions suitable for use in coatings having a low level of VOCs, and which avoid the odor and toxicity concerns and provide at the same time adequate hardness, blocking resistance, and soil resistance, with a low surface tack. The present inventors have endeavored to meet this remaining need.

Accordingly, the present invention provides compositions that achieve in use early development of hardness and water resistance the compositions comprising aqueous blends of one or more copolymer having as copolymerized units one or more acrylic or vinyl monomer with a phosphorus acid-functional group, a low level of one or more polyurethane dispersion (PUD) comprising 40 wt. % or more, based on the weight of the solid PUD, of soft segments provided by high molecular weight polyols, and one or more coalescent having a normal boiling point of 190° C. or higher.

In one embodiment, the present invention provides aqueous compositions comprising (a) one or more copolymer having from 0.1% to 15 wt. %, based on the weight of the copolymer, of a copolymerized or functionalized acrylic or vinyl monomer having one or more acid functional group chosen from a phosphorus acid-functional group, a polymeric side chain containing multiple acid functional groups (referred to herein as "multi-acid functional groups"), a salt thereof, and a combination thereof, and having a glass transition temperature (Tg) of 20° C. or higher, for example, up to 70° C., (b) one or more PUD made from at least 40 wt. %, based on the weight of polyurethane solids, of one or more polyether polyol having a molecular weight of 1,000 or more, one or more second polyol chosen from a polyester, a polycaprolactam, a polycarbonate, and a combination thereof, the second polyol having a molecular weight of at least 2,000, and (c) one or more coalescent having a normal boiling point of 190° C. or higher, wherein the weight ratio of the copolymer to the polyurethane dispersion is from 25/75 to 90/10, preferably from 50/50 to 90/10, more preferably from 60/40 to 85/15, all weight ratios based on the total solids content of the copolymer and PUD. Preferably, the compositions are ambient curable compositions wherein the copolymer further comprises one or more autooxidizable group, such as an acetoacetoxy group.

In another embodiment, the present invention provides coating compositions containing the inventive aqueous compositions and coatings made from the coating compositions.

Unless otherwise indicated, conditions of temperature and pressure are room temperature and standard pressure.

Unless otherwise indicated, any term containing parentheses refers, alternatively, to the whole term as if no parentheses were present and the term without them, and combinations of each alternative. Thus, the term "(meth)acrylic" refers to any of acrylic, methacrylic, and mixtures thereof.

As used herein, unless otherwise indicated, the term "copolymer" refers to polymers made from any two or more different monomers, e.g. terpolymers, pentapolymers &tc., and homopolymers functionalized after polymerization so that two or more different functional groups are present in the product copolymer.

As used herein, the term "ethylenically unsaturated carboxylic acid monomer" refers to acrylic acid, methacrylic acid, beta-acryloxypropionic acid, ethacrylic acid, a-chloroacrylic acid, a-vinylacrylic acid, crotonic acid, a-phenylacrylic acid, cinnamic acid, chlorocinnamic acid, β-styrylacrylic acid, maleic acid, itaconic acid, citraconic acid, cinnamic acid, and salts thereof.

As used herein, the term "functionalized" refers to (co)polymerized monomer units that are modified after polymerization to contain an acid functional group.

As used herein, unless otherwise indicated, the phrase "glass transition temperature" or "Tg" refers to a measured Tg, determined by differential scanning calorimetry (DSC) using a heating rate of 10° C./minute, taking the mid-point in the heat flow versus temperature transition as the Tg value.

As used herein, the term "Tg,8" refers to the calculated glass transition temperature of (co)polymers having a molecular weight being Mw 50,000 or greater, as determined using the Fox equation (T. G. Fox, *Bull. Am. Physics Soc.*, Volume 1, Issue No. 3, page 123(1956)). So, to calculate the Tg,8 of a copolymer of monomers M1 and M2, $1/T_{g,8} = w(M1)/T_g(M1) + w(M2)/T_g(M2)$, wherein w(M1) is the weight fraction of monomer M1 in the copolymer, w(M2) is the weight fraction of monomer M2 in the copolymer, Tg(M1) is the glass transition temperature of the high molecular weight homopolymer of M1, Tg(M2) is the glass transition temperature of the high molecular weight homopolymer of M2, and all temperatures are in °K.

As used herein, the term "Tg, (low)" refers to the glass transition temperature of addition (co)polymer coalescents, determined using the Fox equation, set forth above, with a factor adjusting for the effect of low molecular weight on the Tg of a polymer.

Tg,(low) is determined using the calculation Tg, (low)=Tg, 8−K/Mn, where Tg,8 is the glass transition temperature of the high molecular weight (co)polymer, K is a fitting parameter, Mn is the number-average molecular weight as described herein, and K=300×Tg,8.

As used herein, the term "(meth)acrylate" means acrylate, methacrylate, and mixtures thereof and the term "(meth) acrylic" used herein means acrylic, methacrylic, and mixtures thereof.

As used herein, unless otherwise indicated, the term "molecular weight" refers to the weight average molecular weight of a (co)polymer as measured by gel permeation chromatography (GPC), as calibrated with a polystyrene standard. Gel permeation chromatography, separates the members of a distribution of polymer chains according to their hydrodynamic size in solution rather than their molar mass. The system is then calibrated with standards of known molecular weight and composition to correlate elution time with molecular weight. The term "Mn" refers to the number average molecular weight of a (co)polymer as determined by GPC, as calibrated with a polystyrene standard. The techniques of GPC are discussed in detail in Modem Size Exclusion Chromatography, W. W. Yau, J. J Kirkland, D. D. Bly; Wiley-lnterscience, 1979, and in A Guide to Materials Characterization and Chemical Analysis, J. P.

Sibilia; VCH, 1988, p. 81-84.

As used herein, unless otherwise indicated, the term "normal boiling point" refers to the boiling point of a liquid at 760mm/Hg.

The aqueous composition of the present invention enables achievement of early hardness and water resistance development of an applied film, such as by providing a thermoplastic system containing a blend of one or more vinyl or acrylic polymers having phosphorus acid-functional groups, with a low and cost-effective level of one or more polyurethane dispersion having 40 wt. % or more, based on the weight of the solid PUD, of soft segments provided by high molecular weight polyols, and one or more high boiling coalescent.

The copolymer of the present invention has one or more acid functional group chosen from a phosphorus acid-functional group, a polymeric side chain containing multi-acid functional groups, salts thereof, and combinations thereof. The phosphorus acid-functional group may be a (di)hydrogen phosphate group, phosphonate group, phosphinate group, alkali metal salt thereof, other salt thereof, and a combination thereof. The polymer may contain acid functional groups at levels ranging from 0.1 to 15 wt. %, preferably, from 0.25 to 10 wt. %, and more preferably from 0.5 to 5 wt. %, based on the weight of the copolymer.

The copolymers may be prepared from a wide range of polymerizable ethylenically unsaturated monomers, such as, for example, nonionic ethylenically unsaturated monomers, including a,β-monoethylenically unsaturated monomers, such as alkyl(meth)acrylates. Suitable nonionic ethylenically unsaturated monomers include arylenes, such as styrene, vinyl toluene, vinyl naphthalene, and a-methyl styrene; butadiene; olefins, such as, ethylene, propylene; vinyl esters, such as vinyl acetate, and vinyl versatate; vinyl halides, e.g. vinyl chloride; vinylidene chloride; (meth)acrylonitrile; $C_1$-$C_{40}$ alkyl esters of (meth)acrylic acid; for example, methyl(meth) acrylate, ethyl(meth)acrylate, n-butyl(meth)acrylate, 2-ethylhexyl(meth)acrylate, cyclohexyl(meth)acrylate, n-octyl (meth)acrylate, n-dodecyl(meth)acrylate, tetradecyl(meth) acrylate, cyclopentyl(meth)acrylate, lauryl(meth)acrylate, oleyl(meth)acrylate, palmityl(meth)acrylate, and stearyl (meth)acrylate; other (meth)acrylates, such as isobornyl (meth)acrylate, benzyl(meth)acrylate, phenyl(meth)acrylate, 2-bromoethyl(meth)acrylate, 2-phenylethyl(meth)acrylate, and 1-naphthyl(meth)acrylate; (poly)alkoxyalkyl(meth) acrylates, such as ethoxyethyl(meth)acrylate; and mono-, di-, tri-alkyl esters of ethylenically unsaturated di-and tri-carboxylic acids and anhydrides, such as ethyl maleate, dimethyl fumarate, and ethyl methyl itaconate.

Suitable polymerizable monomers may further include at least one multiethylenically unsaturated monomer. Examples of multiethylenically unsaturated monomers that may be used include allyl(meth)acrylates; glycol di(methacrylates, such as, tripropylene glycol di(meth)acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate; diallyl phthalate; polyol di- or tri-(meth)acrylates, such as trimethylolpropane tri(meth)acrylate; and aromatic di- and tri-vinyl monomers, such as, divinylbenzene, divinyltoluene, trivinylbenzene, and divinyl naphthalene.

Suitable phosphorus acid-functional group may be phosphorus acid ester groups chosen from (di)hydrogen phosphate, oligophosphate, triphosphate, phosphonate, phosphinate and alkali metal and other salts thereof. Suitable phosphorus acid group containing monomers may include, for example, dihydrogen phosphate functional monomers, such as (di)hydrogen phosphate esters of an alcohol containing a polymerizable vinyl or olefinic group, like allyl phosphate, mono-or diphosphate of bis(hydroxy-methyl) fumarate or itaconate, and phosphates of hydroxyalkyl(meth) acrylates including 2-hydroxyethyl(meth)acrylate, 3-hydroxypropyl(meth)acrylates. Other suitable monomers may include, for example, phosphonate functional monomers, like vinyl phosphonic acid, allyl phosphonic acid, 2-acrylamido-2-methylpropanephosphonic acid, a-phosphonostyrene, 2-methylacrylamido-2-methylpropanephosphonic acid. Further suitable monomers may having phosphinate groups, such as, for example, 1,2-ethylenically unsaturated (hydroxy)phosphinylalkyl(meth)acrylate monomers, like (hydroxy)phosphinylmethyl methacrylate.

Preferred dihydrogen phosphate monomers may include:
$CH_2$=$C(CH_3)CO_2CH_2CH_2OPO(OH)_2$
$CH_2$=$C(CH_3)CO_2CH_2CH[OPO(OH)_2]CH_3$
$CH_2$=$C(CH_3)CO_2CH_2CH_2CH_2OPO(OH)_2$
and $CH_2$=$C(CH_3)CO_2CH_2CHOHCH_2OPO(OH)_2$ and the corresponding acrylates.

The copolymer may contain phosphorus acid-functional group containing monomer at levels in the range of 0.1 to 20 wt. %, preferably from 0.5 to 5 wt. %, and more preferably from 1 to 3 wt. %, based on the weight of the copolymer.

Alternatively, a polymer or a copolymer may be functionalized post-polymerization to give acid functional groups. A functionalized homopolymer will form a copolymer, i.e. a polymer having two or more different repeating units because not all repeat units of the polymer are so functionalized. For example, (co)polymers containing amine functionality may be reacted under basic conditions with one or more compound including both epoxy and phosphate functional groups. Similarly, (co)polymers containing epoxide functionality may be reacted with one or more compound including both phosphate and amine groups. The (co)copolymers which are functionalized to give phosphorus acid functional groups may contain levels of phosphorus functional groups equivalent to copolymers prepared from phosphorus functional monomer.

Acid functional groups may also include multi-acid functional groups that are formed from ethylenically unsaturated monomers and that contain multiple acid groups. The multi-acid functional groups may be incorporated into the polymer particle by including as polymerized units, a terminally unsaturated multiacid macromonomer. As used herein, "multiacid macromonomer" refers to an oligomer with a terminal unsaturation and includes monomers with two or more acid groups as polymerized units. The terminal unsaturation and the section of the multiacid macromonomer, may be attached directly or through a linker group, such as an ester, amide or sulfide group. Suitable terminally unsaturated multiacid macromonomers may be polymerized from at least one ethylenically unsaturated carboxylic acid monomer, preferably, acrylic acid and methacrylic acid and optionally at least one second ethylenically unsaturated monomer. Suitable second ethylenically unsaturated monomers include any suitable nonionic ethylenically unsaturated monomer. Such multiacid macromonomers contain as polymerized units from 50 to 100 mole % ethylenically unsaturated carboxylic acid monomer, preferably from 70 to 100 mole %, or most preferably from 90 to 100 mole %.

Suitable multiacid macromonomers may be prepared by bulk, solution, and emulsion polymerization using batch, semicontinuous, or continuous processes. The multiacid macromonomers may be prepared by various conventional synthetic methods including anionic polymerization, radical polymerization with chain transfer agents such as cobalt complexes, catalytic chain transfer polymerization with terminally unsaturated acid macromonomers used as chain transfer agents, and high temperature radical polymerization. For example, the terminally unsaturated multiacid macromonomers may be prepared by conventional radical polymerization using a hydroxy-functional chain transfer agent such as 2-mercaptoethanol followed by the reaction of the hydroxyl group with an ethylenically unsaturated monomer with a complimentary reactive group to attach the terminal unsaturation. Examples of ethylenically unsaturated monomers with a complimentary reactive group include glycidyl(meth) acrylate, isocyanatoethyl(meth)acrylate, or (meth)acrylic acid. The ethylenically unsaturated monomers with a complimentary reactive group may be attached to the fragment of the hydroxy-functional chain transfer agent by various linkages including ether, urethane, amide, amine, or ester linkages.

Another method to prepare the multiacid macromonomers is polymerization of esters of ethylenically unsaturated carboxylic acid monomers such as ethyl acrylate, butyl acrylate, or methyl methacrylate followed by the partial or complete hydrolysis of the ester groups to obtain the carboxylic acid functionalities.

The copolymers having multiacid macromonomers incorporated therein may be prepared by polymerization of a mixture of ethylenically unsaturated monomers including multiacid macromonomer. The copolymer may contain from 0.1 to 20 weight %, preferably, from 0.5 to 10 weight %, and, more preferably, from 1 to 5 weight % multiacid macromonomer, based on the weight of the copolymer.

Optionally, the copolymer may further contain as polymerized units, ionic ethylenically unsaturated monomers such as amide containing monomers, such as (meth)acrylamide, and ethylenically unsaturated carboxylic acid monomers. Suitable levels of ionic ethylenically unsaturated monomer may be in the range of 0 to 10 weight %, preferably 0.1 to 5 weight %, and more preferably 0.5 to 4 weight %, based on the dry weight of the polymer particles.

The copolymer may contain from 0.5 to 300 milliequivalents/gram, preferably 2.5 to 150 milliequivalents/gram, and more preferably 5 to 75 milliequivalents/gram of acid functional groups, based on the dry weight of the polymer particle.

Other suitable polymerizable monomers include functional monomers, for example, small amounts of adhesion-promoting monomers. Examples of such functional monomers include hydroxy-functional monomers, such as, 2-hydroxyethyl(meth)acrylate, amino-functional monomers, such as N,N'-dimethylamino(meth)acrylate, epoxy-functional monomers, such as glycidyl(meth)acrylate, keto-functional monomers, such as (meth)acrolein and diacetone (meth)acrylamide, autooxidizable monomers like acetoacetoxyalkyl(meth)acrylates, e.g. acetoacetoxyethyl (meth)acrylate, dicyclopentadienyl(meth)acrylate, isocyanate-functional monomers dimethyl metaisopropenyl benzyl isocyanate, isocyanato ethyl methacrylate, N-vinyl pyrrolidone, and polymerizable surfactants, including, but not limited to, Trem® LF-40 (Trem is a trademark of Henkel Corporation, King of Prussia, Pa.).

To limit the water sensitivity of the copolymer, the total amount of phosphorus acid, multi-acid, acid, hydroxyl, amine, ketone, aldehyde, aldol, keto-ester (acetoacetoxy), or aldimine group functional groups in the copolymer should not exceed 45 wt. %, or, alternatively, should not exceed 35 wt. %. The copolymers of the present invention may have a glass transition temperature (Tg) in the range of at least about 20° C., preferably at least 30° C., and more preferably at least 40° C. The copolymer Tg should range up to 70° C., or up to 60° C.

The copolymers useful in the aqueous composite particle compositions of this invention may be prepared by any known process which provides copolymerization of ethylenically unsaturated monomers. Suitable processes include suspension or emulsion polymerization at known polymerization temperatures of from room temperature to about 90° C. which be optimized for the catalyst system employed. The copolymers may have monomer compositions, particle sizes, and particle size distributions like those of polymeric latex binders prepared by standard emulsion polymerization techniques known in the art. In addition, the copolymers of the invention may have a unimodal or a multimodal, including a bimodal, particle size distribution.

Emulsion polymerization techniques for preparing an aqueous dispersion of the copolymers from ethylenically unsaturated monomers are well known in the polymer arts, and any conventional emulsion technique for preparing copolymers including single stage processes and multiple stage polymerization processes may be used. The copolymers may be prepared using a seed polymer emulsion to control the number of particles produced by the emulsion polymerization of the polymer, as is known in the art. Preferably, the copolymers are prepared by polymerization in an aqueous medium. More preferably, the aqueous polymerization of the copolymers containing phosphorus acid-functional groups as polymerized units, is conducted at a pH below 5, more preferably at a pH below 4, and most preferably in a pH range of 1 to 4. In one embodiment, the aqueous polymerization of the copolymers contain as polymerized units, dihydrogen phosphate functional monomers is conducted in a pH range of 1 to 2.

A polymerization initiator may be used in carrying out the polymerization to form the polymer particles. Examples of polymerization initiators which may be employed include water-soluble and water-insoluble polymerization initiators which thermally decompose at the polymerization temperature to generate free radicals, such as persulfates, like ammonium or alkali metal (potassium, sodium, or lithium) persulfate; azo compounds, such as 2,2'-azobis(isobutyronitrile), 2,2'-azobis(2,4-dimethylvaleronitrile), and 1-t-butyl azocyanocyclohexane; hydroperoxides, such as t-butyl hydroperoxide and cumene hydroperoxide; peroxides such as, di-t-butyl peroxide; peresters such as t-butyl peracetate; as well as percarbonates, such as di(1-cyano-1-methyl ethyl)peroxy dicarbonate; and perphosphates.

Polymerization initiators may be used alone or as the oxidizing component of a redox system, which also includes a reducing component, such as ascorbic acid, malic acid, or lactic acid, or an alkali metal sulfite, for example, a hydrosulfite, hyposulfite, or metabisulfite, such as sodium hydrosulfite, potassium hyposulfite, and potassium metabisulfite, or sodium formaldehyde sulfoxylate. Examples of redox catalyst systems include t-butyl hydroperoxide/sodium formaldehyde sulfoxylate/Fe(II), and ammonium persulfate/sodium bisulfite/sodium hydrosulfite/Fe(II).

The initiator and the optional reducing component may be used in proportions from 0.001% to 5% each, based on the weight of the ethylenically unsaturated monomers in the monomer mixture to be polymerized.

Accelerators such as chloride and sulfate salts of cobalt, iron, nickel, or copper may be used in small amounts.

Chain transfer agents may optionally be used to control the molecular weight of the polymer particles. Examples of suitable chain transfer agents include mercaptans, polymercaptans, and polyhalogen compounds, including include alkyl mercaptans such as ethyl mercaptan, n-butyl mercaptan, cyclohexyl mercaptan, and n-dodecyl mercaptan; alcohols such as isopropanol; halogenated compounds, such as trichlorobromoethane. Generally from 0 to 10% by weight, based on the weight of the ethylenically unsaturated monomers in the monomer mixture used to prepare the polymer particles, may be used. The polymer molecular weight may be controlled by other techniques known in the art, such as selecting the ratio of the initiator to ethylenically unsaturated monomer.

Aggregation of the copolymers may be discouraged by including a stabilizing surfactant in the polymerization mixture in the polymerization vessel. Many examples of surfactants suitable for emulsion polymerization are given in McCutcheon's Detergents and Emulsifiers (MC Publishing Co., Glen Rock, N. J.), published annually. Other types of stabilizing agents such as protective colloids, may also be used. For example, methyl cellulose and hydroxyethyl cellulose may be included in the polymerization mixture.

The copolymers may be prepared as an aqueous dispersion or suspension with a solids level of from 20 to 70 weight %, preferably in the range of from 35 to 60 weight %.

The compositions of the invention further include one or more polyurethane dispersion (PUD). The polyurethane dispersion may contain a first polyol, which may be a polyether; a second polyol, which may be a polyester, a polycaprolactam, a polycarbonate or a combination thereof; or a combination of at least one first polyol and at least one second polyol. In a preferred embodiment of the invention, the polyurethane contains 40% by weight or more, preferably, at least 44% by weight, more preferably at least 50% by weight, based on the weight of solid polyurethane dispersion, of the first polyol, the second polyol or a combination thereof, wherein the polyols provide soft segments of a high molecular weight.

In one embodiment of the invention, suitable first polyols include polyethers, such as, for example, polyethylene glycols, polypropylene glycols, or polytetraethylene glycols, or mixtures thereof, having a molecular weight of 1,000 or more, preferably from 1,000 to 5,000, more preferably from 1,000 to 3,000, and even more preferably from 1,000 to 2,000.

In another embodiment of the invention, the second polyol may be a polyester, a polycaprolactam or a polycarbonate, or a mixture thereof, having a molecular weight of 2,000 or more, preferably from 2,000 to 5,000, more preferably from 2,000 to 4,000, and even more preferably from 2,000 to 3,000.

Polyesters suitable for the second polyol of the invention include, for example, the hydroxyl-terminated reaction products of polyhydric, preferably dihydric alcohols (to which trihydric alcohols may be added) with polycarboxylic, preferably dicarboxylic acids or their corresponding carboxylic acid anhydrides. Polyester polyols obtained by the ring opening polymerization of lactones, such as e-caprolactone, may also be included.

Suitable polycarboxylic acids which may be used for the formation of polyester polyols may be aliphatic, cycloaliphatic, aromatic and/or heterocyclic and they may be substituted (e.g. by halogen atoms), saturated or unsaturated. Suitable aliphatic dicarboxylic acids include for example, succinic acid, glutaric acid, adipic acid, suberic acid, azelaic acid, sebacic acid and dodecanedicarboxylic acid. Suitable cycloaliphatic dicarboxylic acids include for example, hexahydrophthalic acid. Suitable aromatic dicarboxylic acids include for example, isophthalic acid, terephthalic acid, ortho-phthalic acid, tetrachlorophthalic acids and 1,5-naphthalenedicarboxylic acid. Suitable unsaturated aliphatic dicarboxylic acids include for example, fumaric acid, maleic acid, itaconic acid, citraconic acid, mesaconic acid and tetrahydrophthalic acid. Suitable tri- and tetra-carboxylic acids include for example, trimellitic acid, trimesic acid and pyromellitic acid.

Suitable polyhydric alcohols which may be used for the preparation of the polyester polyols include, for example, ethylene glycol, propylene glycol, 1,3-propanediol, 1,3-butanediol, 1,4-butanediol, 1,5-pentanediol, 1,6-hexanediol, neopentyl glycol, diethylene glycol, dipropylene glycol, triethylene glycol, tetraethylene glycol, dibutylene glycol, 2-methyl-1,3-pentanediol, 2,2,4-trimethyl-1,3-pentanediol, 1,4-cyclohexanedimethanol, ethylene oxide adducts or propylene oxide adducts of bisphenol A or hydrogenated bisphenol A. Triols or tetraols such as trimethylolethane, trimethylolpropane, glycerine and pentaerythritol may also be used. These polyhydric alcohols are generally used to prepare the polyester polyols by polycondensation with the above-mentioned polycarboxylic acids, but according to a particular embodiment they can also be added as such to the polyurethane reaction mixture.

Polycarbonates suitable for the second polyol of the invention include, for example, the reaction products of diols such as 1,3-propanediol, 1,4-butanediol, 1,6-hexanediol, diethylene glycol, triethylene glycol or tetraethylene glycol with phosgene; with diarylcarbonates such as diphenylcarbonate, or with cyclic carbonates such as ethylene and/or propylene carbonate.

Polycaprolactams suitable for the second polyol of the invention include for example, polycaprolactams (nylon 6) containing, (a) a carboxyl group attached to both ends of the polymer chain, (b) a carboxyl group attached to one end and an acetamide group attached to the other end of the polymer chain, (c) an amino group attached to both ends of the polymer chain, (d) a carboxyl group attached to one end and an amino group attached to the other end of the polymer chain.

Particularly preferred is (d) above, a polycaprolactam having a carboxyl group attached to one end and an amino group attached to the other end of the polymer chain.

The polyurethane dispersion of the invention may be anionic salt functional, non-ionic or anionic polyurethane dispersion. The polyurethane dispersion of the invention may be formed by any suitable method, as is lnown in the art.

In one embodiment of the invention, the polyurethane dispersion may be an anionic polyurethane dispersion that may be prepared by reacting at least one of the polyols of the invention with an organic compound having at least one acid group and at least two active hydrogen functionalities, and a polyisocyanate. In this embodiment, suitable organic compounds having at least one acid group and at least two active hydrogen functionalities (hereinafter the "organic compound") include, for example, 2,2-dimethylolacetic acid, 2,2-dimethylolpropionic acid, 2,2-dimethylolbutyric acid, 2,2-dimethylolpentanoic acid. Preferred is 2,2-dimethylolpropionic acid. Examples of acid groups suitable for the organic compound include, carboxylic acid, sulfonic acid, phosphoric, phosphonic acid and the like. Preferred is the carboxylic acid group.

Polyisocyanates are well known in the art and include aliphatic, cycloaliphatic and/or aromatic isocyanates containing at least 2 isocyanate groups per molecule.

Suitable aliphatic diisocyanates include, for example, trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate, trimethylhexane diisocyanate.

Suitable cycloaliphatic diisocyanates include, for example, isophorone diisocyanate, cyclopentylene diisocyanate and the hydrogenation products of aromatic diisocyanates such as cyclohexylene diisocyanate, methylcyclohexylene diisocyanate, dicyclohexylmethane diisocyanate.

Suitable aromatic diisocyanates include, for example, phenylene diisocyanate, tolylene diisocyanate, xylylene diisocyanate, biphenylene diisocyanate, naphthylene diisocyanate and diphenylmethane diisocyanate or isomers or isomeric mixtures thereof.

Suitable triisocyanates include, for example, the biuret of hexamethylene diisocyanate and water, the isocyanurate of hexamethylene diisocyanate, the product of addition of isophorone diisocyanate to trimethylolpropane. Preferred polyisocyanates are aliphatic or cycloaliphatic diisocyanates. Particularly preferred is isophorone diisocyanate.

In one embodiment of the invention, the polyurethane dispersion reaction components may be reacted in a "one-shot" or in a prepolymer process. In the preferred prepolymer process the polyol or the organic compound, or a partial mixture of the two may be reacted with the polyisocyanate to form an isocyanate prepolymer. The prepolymer may then reacted with the remaining unreacted polyol or organic compound or combination thereof, to form the final polyurethane. In the "one shot" process all of the components may be reacted together, with or without solvent, to form the polyurethane. The reaction temperature may be up to about 150° C., but is preferably from 50° C. to 130° C.

The reaction may be carried out in the presence of a catalyst such as organic tin compounds and/or tertiary amines.

The molecular weight of the resulting polyurethane may be from 2,000 to 50,000, preferably from 6,000 to 30,000, and most preferably from 8,000 to 20,000.

Before dispersing the polyurethane in water it may be at least partially neutralized with a tertiary amine or aminoalcohol. Suitable tertiary amines include, for example, trimethyl amine, triethyl amine, dimethyl aniline, diethyl aniline and N-methyl morpholine, and N-ethyl morpholine. Suitable aminoalcohols include dimethyl ethanol amine and triethanol amine. After neutralization, the polyurethane may be diluted with deionized water under agitation to yield a finely divided dispersion.

Chain extension of the dispersed polyurethane dispersion with one ore more diamine, e.g. ethylene diamine, or alkanolamine may be also carried out using methods well known in the art.

The composition of the invention further includes at least one high boiling coalescent which is non-volatile or slow-evaporating and has a normal boiling point of 190° C. or more, preferably 200° C. or more, or, more preferably, 220° C. or more. Suitable high boiling coalescents may include any that have a boiling point of up to 450° C. and which comprise liquids or fluids under normal use conditions, for example, at ambient temperature. Examples of suitable coalescents are chosen from diacid esters, phosphate esters, isobutyrate esters, alkyl esters of fatty acids, fatty ethers, fatty glycerides, fatty acid amides, alkoxylates of fatty acids, addition (co) polymer coalescents, and mixtures thereof. Such coalescents may include, for example, alkyl, branched alkyl, aryl, oxygenated alkyl, or alkylaryl esters of diacids, such as phthalic acids, adipic acids, succinic acids, for example, (di)butyl benzyl phthalate, dibutoxyethoxyethyl adipate; alkyl, oxygenated alkyl, and branched alkyl esters of isobutyrates e.g. 2,2,4-trimethyl-1,3-pentanediol monoisobutyrate (Texanol™, Eastman, Kingsport, Tenn.); alkyl, branched alkyl, oxygenated alkyl, or alkylaryl phosphate esters, such as tributoxy ethyl phosphate; alkyl or alkoxyalkyl esters of isobutyrates, such as for example, 2,2,4-Trimethyl-1,3-pentanediol dilsobutyrate (Texanol™ isobutyrate) or TXIB™ (Eastman); (branched) alkyl, alkylaryl or alkoxyalkyl esters, glycerides, amides and alkoxylates of fatty acids, such as, for example, propylene glycol monoesters of fatty acids, e.g. Archer RC™ esters (ADM, Decatur, Ill.). In one embodiment of the invention, the coalescent may be added as an independent component during formulation of the composition of the invention.

The coalescent can be a low molecular weight addition (co)polymer coalescent having a Tg, (low) of 10° C. or less, preferably, 0° C. or less, or, more preferably, −10° C. or less, and a Mn of 10,000 or less, preferably, 7,500 or less, or, more preferably, 4,000 or less. The Mn of the addition polymer coalescent is preferably 500 or more or, more preferably, or 750 or more.

The addition (co)polymer coalescent may be formed by any means suitable for forming the copolymer of the present invention while controlling the molecular weight of the product, or it can be formed by known rapid high temperature oligomerization of a dilute aqueous solution of monomer, i.e. at 225° C. or higher for from 0.1 to 300 seconds. If formed by means other than aqueous dispersion processes, the addition (co)polymer coalescent may be converted to an aqueous dispersion by techniques known to the art.

The molecular weight of the addition (co)polymer coalescent may be controlled by any means known in the art, such as by inclusion of one or more chain transfer agent. Suitable chain transfer agents may be selected from mercaptans, polymercaptans, thioesters, halogenated compounds and combinations thereof, preferably, linear or branched $C_4$-$C_{22}$ alkyl mercaptans such as n-dodecyl mercaptan and t-dodecyl mercaptan. Alternatively, molecular weight may be controlled through the use of catalytic chain transfer agents, such cobalt compounds, for example, cobalt (II) dioxime or porphyrin chelate complexes, like CoII (bis 2,2'-dimethylbenzildioxime diborondifluoride), CoII (bis 3,3'-dimethylbenzildioxime diborondifluoride) or CoII (bis 4,4'-dimethylbenzildioxime diborondifluoride). Alternatively, the addition (co)polymer coalescent may be formed in the presence of a macromolecular organic compound having a hydrophobic cavity, e.g. a cyclodextrin compound or a molecular cage.

The addition (co)polymer coalescent can be prepared separately from the copolymer, or it can be formed in the presence of the copolymer of the invention, or the copolymer can be formed in the presence of the addition (co)polymer coalescent. In any case, the monomer(s) and/or any chain transfer agent(s) may be added to the aqueous dispersion in a single charge and polymerized in a single batch, or shot fashion, may be added gradually as polymerization proceeds in a manner referred to as semi-continuous or continuous polymerization, or they may be added in some combination of shot and gradual addition techniques to form the addition polymer coalescent.

In one embodiment, the copolymer is formed in the presence of the addition (co)polymer coalescent. In this embodiment, the monomers comprising the copolymer are polymerized in a reaction vessel in which the addition polymer coalescent is present, such as, for example, by providing an aqueous dispersion of the addition (co)polymer coalescent, adding one or more ethylenically unsaturated monomer to the dispersion; and causing the one or more monomer to polymerize by known means. A combination of shot and gradual addition techniques may be used to form the copolymer, which generally has a considerably higher molecular weight than the addition (co)polymer coalescent. Alternatively, a miniemulsion may be formed from a mixture comprising the addition (co)polymer coalescent and one or more ethylenically unsaturated monomers, and, subsequently, polymerizing the monomers.

In another embodiment, the addition (co)polymer coalescent may be formed in the presence of the copolymer by polymerizing the monomers comprising the addition polymer coalescent in a reaction vessel in which the copolymer is present. Preferably, the monomer(s) used to form the addition (co)polymer coalescent and chain transfer agent(s) are combined with an aqueous dispersion comprising the copolymer, and polymerizing the monomer(s).

In yet another embodiment the addition (co)polymer coalescent may be formed separately from the copolymer of the invention.

Suitable total amounts of the high boiling coalescent will vary in proportion to the Tg of the copolymer, as more of the coalescent may be needed for a higher Tg copolymer. Suitable amounts of the coalescent may be 2 wt. % or more, or, 5 wt. % or, or 7 wt. % or more, based on the total weight of the copolymer, and may range up to 40 wt. %, or up to 30 wt. %, or less than 25 wt. %. Suitable minimum amounts of the addition polymer coalescent may be at least 5 wt. %, or at least 7 wt. %, or at least 10 wt. %, based on the total weight of the copolymer.

The compositions of the invention are suitable for use in pigmented and unpigmented coating compositions for a variety of substrates such as metal, plastic, wood, and cementitious substrates, such as Portland cement based substrates, and natural stone. The compositions provide early property development of coating compositions containing blends of the polymer particles, polyurethane dispersion and plasticizer of the invention. In formulating coating compositions, additives known in the art, such as external crosslinkers, e.g. diamines or polyamines, may be used.

EXAMPLES

These examples illustrate specific embodiments of the present invention. In the examples, the following abbreviations are used:

| | |
|---|---|
| BA = butyl acrylate | EHA = 2-ethylhexyl acrylate |
| MMA = methyl methacrylate | APS = ammonium persulfate |
| ALMA = allyl methacrylate | PUD = polyurethane dispersion |
| AAEM = acetylacetoxy ethylmethacrylate | DMPA = dimethylol propionic acid |
| MAA = methacrylic acid | NMP = methyl-2-pyrrolidinone |
| PEM = phosphoethyl methacrylate | EDA = ethylene diamine |
| STY = styrene | |

Fomrez™ 66-112: Hexanediol adipate of molecular weight 1000, Chemtura Corporation, Middlebury, Conn.

Fomrez™ 44-56: Butanediol adipate of molecular weight 2000, Chemtura Corporation.

Ninol™ 96SL: Lauryl diethanolamide, Stepan Company, Northfield, Ill.

Terathane™ 2000: Polytetramethylene ether glycol of molecular weight 2000, Invista, Wichita, Kans.

DESW™: Dicyclohexylmethane diisocyanate, Bayer Corporation, Pittsburgh, Pa.

Tamol™ 2001: A dispersant, Rohm and Haas Company, Philadelphia, Pa.

Surfynol™ CT-111: A surfactant. Air Products Corporation, Allentown, Pa.

Drewplus™ L-493: A defoamer. Ashland Chemical, Covington, Ky.

TiPure™ R-706: A pigment. Dupont, Wilmington, Del.

Texanol™: 2,2,4-Trimethyl-1,3-pentanediol diisobutyrate, a coalescent. Eastman Chemical Co., Kingsport, Tenn.

TXIB™: 2,2,4-Trimethyl-1,3-pentanediol diisobutyrate, from Aldrich Chemicals, St. Louis, Mo.

Acrysol™ RM-8W: A thickener. Rohm and Haas Company.

Examples A1-A4

Preparation of Copolymers

Example A1

A polymer emulsion having the composition 30 STY/30.5 EHA/31.8 MMA/5 AAEM/2.7 PEM was prepared as follows:

A (first) monomer emulsion (ME1) was prepared using 450 g of DI water, 50.3 g of 30.5 weight percent active ingredient sodium laureth sulfate with an ethylene oxide level of 1 to 4, 555 g STY, 564.3 g EHA, 588 g of methyl methacrylate, 92.5 g of AAEM and 50.3 g of PEM. A five-liter, 4-neck round bottom flask containing an initial charge of 1300 g DI water and a solution of 10 g of 30 weight percent active ingredient sodium laureth sulfate with an ethylene oxide level of 1 to 4 in 15 g of water, followed by a rinse of 20 g of DI water, was heated to 88° C. under nitrogen sweep. An aliquot of ME1 (55 g) was added to the flask along with a rinse of 25 g of DI water which was followed by the addition of 6.5 g APS dissolved in 30 g DI water and a rinse of 10 g of DI water. After stirring for 15 minutes, the remaining ME1 and a solution of 2.8 g of APS in 70 g of DI water were added linearly and separately to the reaction flask over 2 hours. The temperature of the batch in the kettle was maintained at 85-86° C. during the addition. When all additions were complete, the ME1 container was rinsed with 40 g of DI water and the APS container was rinsed with 5 g of water which were then added to the reaction flask. A catalyst/activator pair was added after the monomer emulsion feed was completed. The polymer was neutralized with aqueous ammonia (29%). The solids content was 45.3%.

Example A2

A polymer emulsion having the composition 18 BA/21.3 MMA/0.2 MAA/0.4 ALMA/21.5 BA/26.7 MMA/9.2 AAEM/2.7 PEM was prepared as follows:

A second monomer emulsion (ME2) was prepared using 180 g of DI water, 6.7 g of 59 weight percent active ingredient surfactant PEG™ 200 nonyl phenyl ether sulfate (Rhodia, Cranbury, N.J.), ammonium salt, 5.6 g of 25 weight percent active sodium lauryl sulfate, 361.3 g of BA, 427.5 g of MMA, 4 g of MAA and 8.0 g of ALMA. A five-liter, 4-neck round bottom flask containing an initial charge of 1337 g deionized (DI) water and a solution of 20.6 g of 59 weight percent active ingredient PEG™ 200 nonyl phenyl ether sulfate, ammonium salt in 20 g of water, followed by a rinse of 30 g of DI water, was heated to 84° C. under nitrogen sweep. An aliquot of ME2 (103.8 g) was added to the flask. The container containing the aliquot of ME2 was rinsed with 30 g of DI water which was then added to the flask, followed by the addition of 4 g sodium persulfate dissolved in 35 g DI water. After stirring for 15 minutes, the remaining ME2 and a solution of 0.75 g of APS in 54.8 g of DI water were added linearly and separately to the reaction flask over 0.8 hours. The temperature of the batch in the kettle was maintained at 84-86° C. during the addition. When all additions were complete, the ME2 container was rinsed with 25 g of DI water, which was then added to the reaction flask. The reaction was allowed to stir for 30 minutes.

A third monomer emulsion, (ME3) was prepared using 300 g of DI water, 15.7 g of 59 weight percent active ingredient surfactant PEG 200 nonyl phenyl ether sulfate, ammonium salt, 431.5 g BA, 535.4 g of MMA, 184.6 g of AAEM, and 54.6 g of PEM. ME3 and a solution of 1.25 g of ammonium persulfate in 91.2 g of DI water were added linearly and separately to the reaction flask over 1.7 hours. The temperature of the batch in the kettle was maintained at 85-86° C. during the addition. When all additions were complete, the ME3 container was rinsed with 30 g of DI water and the APS container was rinsed with 5 g of water, which were then added to the reaction flask. A catalyst/activator pair was added after the monomer emulsion feed was completed. The polymer was neutralized with aqueous ammonia (29%). The solids content was 46.8%.

Example A3

A polymer having a composition of 18.04 BA/21.36 MMA/0.2 MAA/0.4 ALMA/20.94 BA/28.32 MMA/9.24 AAEM/1.5 MAA was prepared as described for Example A2 except that MAA was used and PEM was omitted.

Example A4

A polymer emulsion having the composition 35.2 BA/57.1 MMA/5 AAEM/2.7 PEM was prepared as follows:

A fourth monomer emulsion (ME4) was prepared using 450 g of DI water, 42 g of 30.8 weight percent active ingredient sodium laureth sulfate with an ethylene oxide level of 1 to 4, 651.2 g BA, 1056 g MMA, 50.3 g of PEM, and 92.5 g of AAEM. A five-liter, 4-neck round bottom flask containing an initial charge of 1285 g DI water and a solution of 33 g of 30 weight percent active ingredient sodium laureth sulfate with an ethylene oxide level of 1 to 4 in 25 g of water, followed by a rinse of 25 g of DI water, was heated to 88° C. under nitrogen sweep. An aliquot of ME4 (60.5 g) was added to the flask along with a rinse of 25 g of DI water which was followed by the addition of 6.5 g APS dissolved in 30 g DI water and a rinse of 10 g of DI water. After stirring for 15 minutes, the remaining ME4 and a solution of 2.8 g of APS in 70 g of DI water were added linearly and separately to the reaction flask over 2 hours. The temperature of the batch in the kettle was maintained at 85-86° C. during the addition. When all additions were complete, the ME4 container was rinsed with 40 g of DI water and the APS container was rinsed with 5 g of water which were then added to the reaction flask. A catalyst/activator pair was added after the monomer emulsion feed was completed. The polymer was neutralized with aqueous ammonia (29%). The solids content was 44.5%.

Examples B1-B3

Preparation of Polyurethane Dispersions (Puds)

Example B1

A PUD having a composition of 28.2 DESW/63.7 Terathane 2000/5.9 DMPA/2.2 EDA was prepared as follows:

The following reaction components were provided:

| | |
|---|---|
| Polytetramethylene ether glycol of molecular weight 2000 | 530.0 g |
| Dicyclohexylmethane diisocyanate | 235.0 g |
| Dimethylol propionic acid (DMPA) | 49.0 g |
| Methyl-2-pyrrolidinone (NMP) | 203.0 g |

The polytetramethylene ether glycol was dried at 80° C. for two hours under vacuum in a resin flask equipped with a mechanical stirrer, thermometer, nitrogen inlet and condenser. After cooling to 60° C., DMPA, NMP and dicyclohexylmethane diusocyanate were charged to the flask. The mixture was heated to 95° C. and stirred until the percent isocyanate content was 2.1% by titration and remained constant. The reaction product was an isocyanate functional prepolymer.

After cooling to 75° C., triethyl amine (36.9 g) was added to the prepolymer mixture and stirred for thirty minutes. Next, the neutralized prepolymer was dispersed by addition to water with high shear mixing. Immediately after dispersion, the chain extender solution of ethylene diamine in water (18.2/36.4 g) was added with stirring at room temperature and was continued for two hours, resulting in an aqueous PUD having a solids content of 33.3%, particle size of 72 nm, and pH of 9.9.

Example B2

A PUD having a composition of 38.9 DESW/51.5 Fomrez 66-112/5.8 DMPA/3.9 EDA was prepared as follows:

The following reaction components were provided:

| | |
|---|---|
| Hexanediol adipate of molecular weight 1000 | 478.0 g |
| Dicyclohexylmethane diisocyanate | 361.0 g |
| Dimethylol propionic acid (DMPA) | 53.8 g |
| Methy-2-pyrrolidinone (NMP) | 215.0 g |

The hexanediol adipate (MW 1000) was dried at 80° C. for two hours under vacuum in a resin flask equipped with a mechanical stirrer, thermometer, nitrogen inlet and condenser. After cooling to 60° C., DMPA, NMP and dicyclohexylmethane diisocyanate were charged to the flask. The mixture was heated to 985° C. and stirred until the percent isocyanate content was 3.7% by titration and remained constant. The reaction product was an isocyanate functional prepolymer.

After cooling to 75° C., triethyl amine (40.6 gms) was added to the prepolymer mixture and stirred for thirty minutes. Next, the neutralized prepolymer was dispersed by addition to water with high shear mixing. Immediately after dispersion, the chain extender solution of ethylene diamine in water (35.0/70.0 g) was added and stirring at room temperature was continued for two hours, resulting in an aqueous PUD having a solids content of 33.2%, particle size of 47 nm, and pH of 9.8.

Example B3

A PUD having a composition of 29.7 DesW/61.8 Fomrez 44-56/1.2 Ninol 96SL/5.9 DMPA/1.4 EDA was prepared as follows:

The following reaction components were provided:

| | |
|---|---|
| Butanediol adipate of molecular weight 2000 | 434.7 g |
| Dicyclohexylmethane diisocyanate | 208.2 g |
| Dimethylol propionic acid (DMPA) | 41.5 g |
| Lauryl diethanolamide (90%) | 9.0 g |
| Methy-2-pyrrolidinone (NMP) | 170.0 g |

The butanediol adipate and lauryl diethanolamide were dried at 80° C. for two hours under vacuum in a resin flask equipped with a mechanical stirrer, thermometer, nitrogen inlet and condenser. After cooling to 60° C., DMPA, NMP and dicyclohexylmethane diisocyanate were charged to the flask. The mixture was heated to 95° C. and stirred until the percent isocyanate content was 2.2% by titration and remained constant. The reaction product was an isocyanate functional prepolymer.

After cooling to 75° C., triethyl amine (31.3 g) was added to the prepolymer mixture and stirred for thirty minutes. Next, the neutralized prepolymer was dispersed by addition to water with high shear mixing. Immediately after dispersion, the chain extender solution of ethylene diamine in water (9.8/19.7 g) was added and stirring at room temperature was continued for two hours, resulting in an aqueous PUD having a solids content of 31.9%, particle size of 54 nm, and pH of 7.6.

Examples 1-5

Preparation and Testing of Paints

Examples 1-5

White gloss paints (18 Pigment Volume Content (PVC), 33% volume solids) based on the copolymersand polyurethane dispersions were prepared according to the recipes given in Table 2 below, where the TiO2 dispersions were prepared from dry TiO2 pigment. The composition of the TiO2 dispersion is described in Table 1. The amount of the high boiling coalescent was held at 12 wt. %, based on the weight of polymer solids. In those examples where the PUDs were formulated by themselves, no plasticizer was used, and the solids level of the paint was reduced some to accommodate for the lower solids of the PUDs.

Film hardness of the white gloss paints was tested on dried paints (thickness approximately 62 μm or 2.5 mil) applied to aluminum panels at a wet film thickness of 307 μm or 12 mils. Hardness testing was measured via pendulum damping (according to the ASTM D4366 method) as a function of time after sample preparation.

TABLE 1

Composition of TiO2 dispersion

| Ingredient | Parts by Weight |
|---|---|
| Water | 5.65 |
| Tamol ™ 2001 dispersant | 1.18 |
| Surfynol ™ CT-111 | 0.23 |
| Aqueous ammonia (28%) | 0.23 |
| Drewplus ™ L-493 | 0.11 |
| TiPure ™ R-706 | 24.79 |

TABLE 2

Paint compositions and Pendulum Hardness

| Ingredient | Example 1* | Example 2 | Example 3* | Example 4* | Example 5* |
|---|---|---|---|---|---|
| Example A1 Polymer | 66.78 | 53.43 | | 53.43 | |
| Example B1 PUD | | 18.12 | 90.66 | | |
| Example B2 PUD | | | | 18.23 | 91.21 |
| Water | 20.93 | 17.32 | 1.23 | 17.48 | 1.71 |
| Aqueous ammonia (28%) | 0.46 | | | | |
| TiO2 dispersion | 32.19 | 32.19 | 32.19 | 32.19 | 32.19 |
| Texanol ™ | 3.63 | 2.90 | | 2.90 | |
| Acrysol ™ RM-8W | 0.34 | 0.62 | 1.23 | 0.45 | 1.70 |
| % PUD | 0 | 20% | 100% | 20% | 100% |
| 1 week dry Pendulum Hardness (sec$^{-1}$) | 16.8 | 93.8 | 46.2 | 39.2 | 91.0 |

*Comparative

As shown in Table 2, above, a Pendulum Hardness test showed a hardness achieved with the waterbased paint film of the present invention (Example 2) to be well more than double that achieved with the comparative Example 3, made using the same PUD, and is about five times that of Example 1, made using the same copolymer. This comparison held even though the PUD component of the Example 5 coating made with a polyester polyol with a molecular weight of 1000 was harder than the PUD component of the Example 3 coating made with a polyether polyol with a molecular weight of 2000. Accordingly, the formulated coalescent in a softer PUD made from a softer, higher molecular polyol greatly improves coating hardness of an ambient curable coating Example 6-13

Preparation and Testing of White Paints

Examples 6-13

White gloss paints (18PVC, 33% volume solids) based on the copolymers and polyurethane dispersions were prepared according to the recipes given in Table 4, below, where the TiO2 dispersions were prepared from dry TiO2 pigrnent. The composition of the TiO2 dispersion is as described in Table 3, below. The amount of high boiling coalescent was held at 12% on the polymer particle solids. In those examples where the PUDs were formulated by themselves, no high boiling coalescent was used, and the volume solids of the paint was reduced to 30% (to accommodate for the lower solids of the PUDs).

Water Immersion Test: Paints were applied to a substrate, dried at 25° C. for 6 hours, and then immersed in deionized water overnight. The paint films were then removed from the DI water and rated for swelling and blistering according to the ASTM D714 (2002) method (where for density of blisters: MD=Medium to dense; D=Dense; and blister size ranges from: 1-10, with 1 being the largest size).

Film Hardness Test: Film hardness of the white gloss paints was tested on dried paints (approximately 2.5 mil) applied to aluminum panels at a wet film thickness of 12 mils. Hardness testing was measured via pendulum damping (according to the ASTM D4366 method) as a function of time after sample preparation.

TABLE 3

Composition of TiO2 dispersion

| Ingredient | Parts by Weight |
| --- | --- |
| Water | 5.65 |
| Tamol ™ 2001 dispersant | 1.18 |
| Surfynol ™ CT-111 | 0.23 |
| Aqueous ammonia (28%) | 0.23 |
| Drewplus ™ L-493 | 0.11 |
| TiPure ™ R-706 | 24.79 |

TABLE 4A

Paint compositions, Water Immersion and Pendulum Hardness

| Ingredient | Example 6* | Example 7 | Example 8* | Example 9* |
| --- | --- | --- | --- | --- |
| Example A2 Polymer | 65.26 | 45.68 | | 45.68 |
| Example A3 Polymer | | | | |
| Example B1 PUD | | 27.20 | 82.42 | |
| Example B2 PUD | | | | 27.36 |
| Water | 23.44 | 16.65 | 10.39 | 16.58 |
| Aqueous ammonia (28%) | 0.38 | 0.33 | | |
| TiO2 dispersion | 32.19 | 32.19 | 29.26 | 32.19 |
| Texanol ™ | 3.63 | 2.54 | | 2.54 |
| Acrysol ™ RM-8W | 0.29 | 0.63 | 1.07 | 0.53 |
| % PUD | 0% | 30% | 100% | 30% |
| Water Immersion Test | no damage | no damage | Film swelling | no damage |
| 2 week dry, Pendulum Hardness (sec$^{-1}$) | 14.0 | 54.6 | 46.2 | 44.8 |

*Comparative

TABLE 4B

Paint compositions, Water Immersion and Pendulum Hardness

| Ingredient | Example 10* | Example 11* | Example 12 | Example 13* |
| --- | --- | --- | --- | --- |
| Example A2 Polymer | | | | |
| Example A3 Polymer | | 69.40 | 47.64 | 47.64 |
| Example B1 PUD | | | 28.42 | |
| Example B2 PUD | 82.91 | | | 28.60 |
| Water | 7.47 | 21.04 | 14.70 | 14.31 |
| Aqueous ammonia (28%) | | | | |
| TiO2 dispersion | 29.26 | 32.19 | 32.19 | 32.19 |

TABLE 4B-continued

Paint compositions, Water Immersion and Pendulum Hardness

| Ingredient | Example 10* | Example 11* | Example 12 | Example 13* |
| --- | --- | --- | --- | --- |
| Texanol ™ | | 3.87 | 2.66 | 2.66 |
| Acrysol ™ RM-8W | 1.75 | 0.25 | 0.60 | 0.82 |
| % PUD | 100% | 0% | 30% | 30% |
| Water Immersion Test | Blisters (6-8D) | no damage | Film swelling | Blisters (4-6MD) |
| 2 week dry, Pendulum Hardness (sec$^{-1}$) | 72.8 | 16.8 | 65.8 | 64.4 |

*Comparative

Tables 4A and 4B, above, show that the Example 6 coating formulated with 100% of Example A2 Polymer (containing PEM) or the Example 11 coating with 100% of Example A3 polymer, with no PEM, have good early water resistance, while coatings prepared using 100% of Example B1 PUD (Example 8) or Example B2 PUD (Example 10) have poor water resistance. The Example 7 blends of Example A2 Polymer with Example B1 PUD (A2-B1) and the Example 12 blend of Example A2 polymer and Example B2 PUD (A2-B2) have good early water resistance compared, respectively, with Example 9 (A2-B2) and Example 13 (A3-B2). Only the Example 7 of present invention provides for both good early water resistance and hardness. Improved hardness is observed even though the coating made the PUD of Example 9, made with a polyester polyol with a molecular weight of 1000 is harder than coating of the PUD component of Example 7, made with a polyester polyol with a molecular weight of 2000.

Example 14-15

Preparation and Testing of White Paints

Examples 14-15

White gloss paints (18PVC, 33% volume solids) based on the copolymers and PUDs were prepared according to the recipes given in Table 6 below, where the TiO2 dispersions were prepared from dry TiO2 pigment. The composition of the TiO2 dispersion is described in Table 5. The amount of plasticizer (TXIB) was held at 12% on the polymer particle solids. The approximate 50 g/l VOC in the paint of Example 14 of present invention comes from the NMP present in Example B3 PUD.

Film Hardness Test: Film hardness of the white gloss paints was tested on dried paints (approximately 2.5 mil) applied to aluminum panels at a wet film thickness of 12 mils. Hardness testing was measured via pendulum damping (according to the ASTM D4366 method) as a function of time after sample preparation.

TABLE 5

Composition of TiO2 dispersion

| Ingredient | Parts by Weight |
| --- | --- |
| Water | 12.50 |
| Tamol ™ 2001 dispersant | 1.88 |
| Surfynol ™ CT-111 | 0.50 |
| Aqueous ammonia (28%) | 0.50 |
| Drewplus ™ L-493 | 0.25 |
| TiPure ™ R-706 | 52.59 |

TABLE 6

Composition of Paints

| Ingredient | Example 14* | Example 15 |
|---|---|---|
| Example A4 Polymer | 136.63 | 96.40 |
| Example B3 PUD |  | 58.28 |
| Water | 40.00 | 25.00 |
| Aqueous ammonia (14%) | 1.40 | 1.5 |
| TiO2 dispersion | 68.22 | 68.22 |
| TXIB ™ | 7.46 | 5.25 |
| Acrysol ™ RM-8W | 1.00 | 2.2 |
| % PUD | 0% | 30% |
| Pendulum Hardness (sec$^{-1}$) | | |
| 1 day dry | 22 | 27 |
| 2 day dry | 27 | 38 |
| 3 day dry | 25 | 43 |
| 6 day dry | 25 | 63 |
| 8 day dry | 27 | 74 |
| 14 day dry | 27 | 95 |

*Comparative

Table 6 shows that early hardness development of coatings based on 100% of the Example A4 polymer (Example 14) is poor, while the hardness of Example 15 of current invention increases rapidly after a few days of drying, even though more of the high boiling coalescent, TXIB, is present in the Example 14 coating. Accordingly, the combination of PUD, copolymer and the high boiling coalescent at about 12 wt. %, based on polymer solids, provides hardness development like a PUD with only 30% of polymer solids as a PUD.

We claim:

1. An aqueous composition that achieves in use an early hardness development comprising:
   a. one or more copolymer having from 0.1% to 20 wt. %, based on the weight of the copolymer, of a copolymerized or functionalized acrylic or vinyl monomer having one or more acid functional group chosen from a phosphorus acid-functional group, a polymeric side chain containing multi-acid functional groups, a salt thereof, and a combination thereof,
   wherein the copolymer has a glass transition temperature of 20° C. or higher;
   b. one or more polyurethane dispersion containing at least 40 wt.%, based on the weight of polyurethane solids, of:
      i. a first polyol having a molecular weight of at least 1,000, wherein the first polyol is a polyether polyol, or
      ii. a second polyol chosen from a polyester, a polycaprolactam, a polycarbonate and a combination thereof, wherein the second polyol has a molecular weight of at least 2,000, or
      iii. a combination of one or more first polyol and one or more second polyol; and
   c. from 2.0 wt.% to 40.0 wt.%, based on the weight of copolymer solids of one or more coalescent having a normal boiling point of 190° C. or higher, the coalescent chosen from diacid esters, phosphate esters, isobutyrate esters, fatty ethers, alkoxylates of fatty acids, addition (co)polymer coalescents, or mixtures thereof,
   wherein the weight ratio of the copolymer solids to the polyurethane dispersion solids is from 25/75 to 90/10.

2. The aqueous composition according to claim 1, wherein the copolymerized or functionalized acrylic or vinyl monomer has one or more phosphorus acid-functional group chosen from (di)hydrogen phosphate, phosphonate, phosphinate, a salt thereof, or a mixture thereof.

3. The aqueous composition according to claim 1, wherein the copolymer further comprises, as polymerized units, one or more ionic ethylenically unsaturated monomer chosen from an ethylenically unsaturated carboxylic acid monomer.

4. The aqueous composition according to claim 1, wherein the copolymer further comprises, as polymerized units, one or more autooxidizable group chosen from an acetoacetoxy group.

5. An aqueous composition as claimed in claim 1, wherein the copolymer further comprises one or more functional monomer chosen from a hydroxy-functional monomer, an amino-functional monomer, an epoxy-functional monomer, a keto-functional monomer, an isocyanate-functional monomers, or a mixture thereof.

6. The aqueous composition according to claim 1, wherein the one or more coalescent is chosen from isobutyrate esters.

7. An aqueous composition comprising as claimed in claim 1, wherein the amount of the coalescent ranges 5.0 to 40.0 wt.% wt.%, based on the weight of copolymer solids.

8. An aqueous composition according to claim 1, further comprising one or more external crosslinker.

* * * * *